F. ALLDRITT.
HOG OILER.
APPLICATION FILED JULY 29, 1915.
1,180,685.
Patented Apr. 25, 1916.
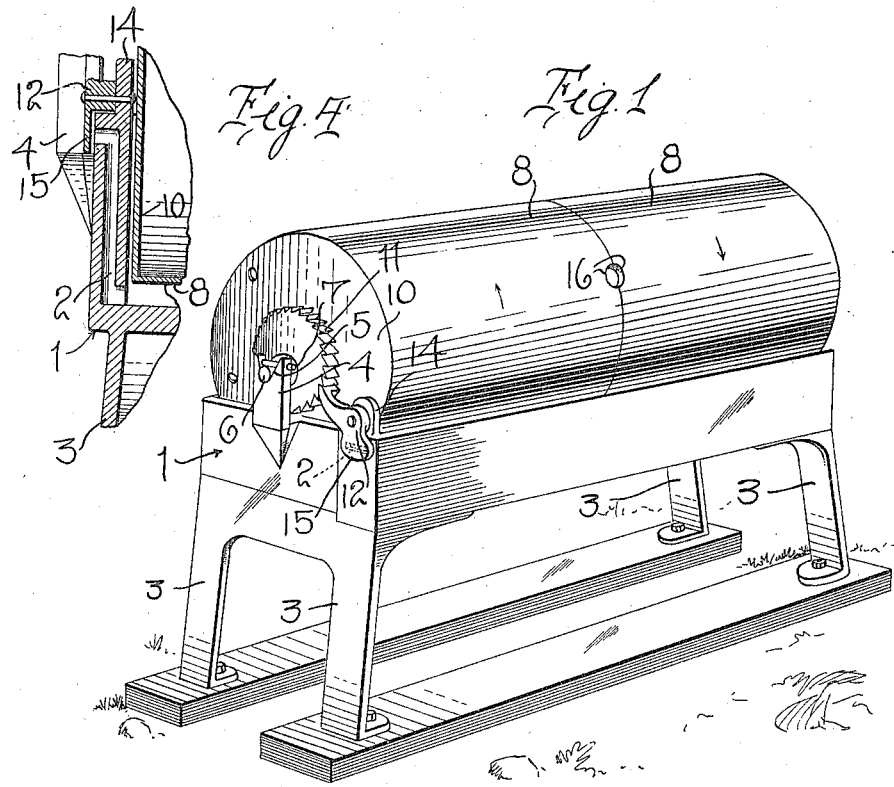
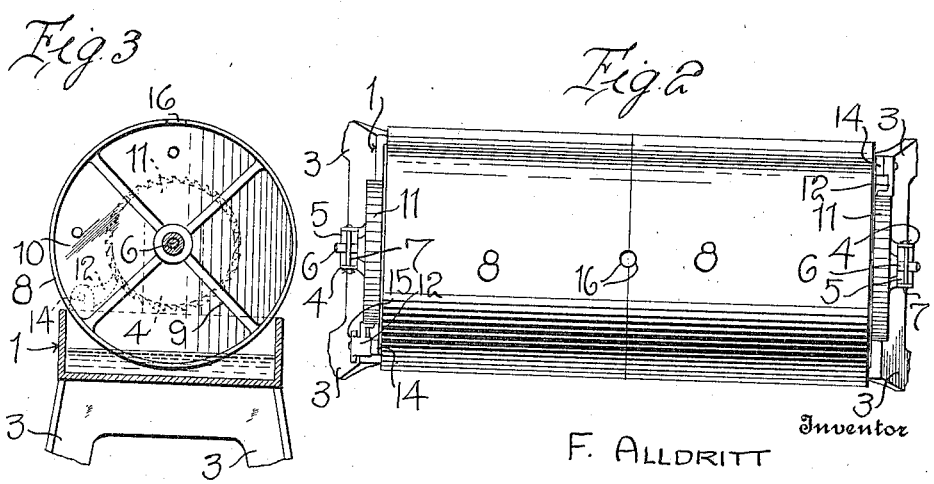
F. ALLDRITT
Inventor
By Watson E. Coleman
Attorney

UNITED STATES PATENT OFFICE.

FRANK ALLDRITT, OF LINCOLN, NEBRASKA.

HOG-OILER.

1,180,685.

Specification of Letters Patent.  Patented Apr. 25, 1916.

Application filed July 29, 1915.  Serial No. 42,538.

*To all whom it may concern:*

Be it known that I, FRANK ALLDRITT, a citizen of the United States, residing at Lincoln, in the county of Lancaster and State of Nebraska, have invented certain new and useful Improvements in Hog-Oilers, of which the following is a specification, reference being had to the accompanying drawings.

This invention relates to certain improvements in hog oilers, and it is an object of the invention to provide a novel and improved device of this general character whereby it is assured that the oil is applied to the animal upon its rubbing against the device.

Furthermore, it is an object of the invention to provide two independently rotatable delivery rollers revolving in opposite directions, each of said rollers being arranged for movement only in one direction.

It is also an object of the invention to provide a device of this general character including an oil pan provided with means whereby water collected within the pan may be readily and conveniently discharged therefrom.

The invention consists in the details of construction and in the combination and arrangement of the several parts of my improved hog oiler whereby certain important advantages are attained and the device is rendered simpler, less expensive and otherwise more convenient and advantageous for use, all as will be hereinafter more fully set forth.

The novel features of the invention will be carefully defined in the appended claims.

In order that my invention may be the better understood, I will now proceed to describe the same with reference to the accompanying drawings, wherein—

Figure 1 is a view in perspective of a hog oiler constructed in accordance with an embodiment of my invention; Fig. 2 is a view in top plan of the device as disclosed in Fig. 1, with the lower portions of the supporting members broken away; Fig. 3 is a vertical sectional view taken through the device as disclosed in Fig. 1 at substantially the longitudinal center thereof, showing an end of one of the drums in elevation; and Fig. 4 is an enlarged fragmentary sectional view illustrating in detail a discharging channel as herein included.

As disclosed in the accompanying drawings, I denotes a pan of predetermined dimensions, preferably rectangular in form, and having its end wall adjacent a side wall provided with a vertically disposed conduit 2, the lower extremity of which being in communication with the interior of the pan adjacent the bottom thereof, while the top of said conduit is in communication with the atmosphere adjacent the upper edge of the end wall. By this arrangement it will be perceived that as the oil initially placed within the pan rises owing to the accumulation of water, as a result of rain, the collected water will be discharged through the conduit 2 when the level of the water rises above the upper or discharging end of the conduit. The pan 1 is adapted to be supported in a horizontal position and while any supporting means may be employed which will operate with convenience and facility, I prefer to employ the supporting members 3 of conventional construction.

Extending upwardly from each of the ends of the pan 1 at substantially the transverse center of the pan are the alined arms 4 having their upper extremities provided with the recesses 5 to afford bearings for the supporting shaft 6, said shaft being held against displacement through the medium of the pin 7 disposed through the upper extremities of the arms above the shaft. It is to be observed that these pins are removable so that the shaft may be applied or removed as desired with convenience and facility. Rotatably mounted upon the shaft 6 are the drums 8 having their outer ends closed and their inner extremities provided with the spiders 9 to afford additional supports for the drums, said spiders being also rotatably engaged with the shaft 6.

The head 10 of each of the drums is provided with the ratchet wheel 11 arranged concentric to the axial center of the head and with which coacts the pawl 12 pivotally engaged with the lug 14 extending upwardly from the pan and it is to be observed that this lug serves to prevent rotation of the drum in one direction by an animal rubbing against the drum. It is also to be observed that the ratchet wheels 11 and pawls 12 are so arranged that the drums are capable of rotating in opposite directions only so that it is assured that the rollers will deliver to the animal the oil within the pan irrespective of the direction of rub of the animal. It has been found in practice that if the drums were permitted to freely rotate in opposite directions, it is impossible to obtain the proper delivery of oil to the animal.

I also find it of advantage to provide each of the pawls 12 with an ear 15 adapted to overlie the discharging ends of the conduits 2 so that mud or other foreign matter is prevented from obstructing the flow through said conduits. I also find it of advantage to provide the adjacent margins of the drums 8 with the notches 16 which, when in register, afford a filling opening whereby the tank may readily receive an initial supply of oil. It is also to be observed that the drums 8 substantially entirely incase the pan and that the peripheries of said drums are free and unobstructed so that the oil carried upwardly thereby may readily drain back within the pan.

From the foregoing description, it is thought to be obvious that a hog oiler constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice.

I claim:

1. A hog oiler comprising a pan, two hollow rollers rotatably supported thereby and extending therein, the outer ends of said rollers being closed the adjacent margins of the rollers being provided with recesses to afford when in register a filler opening.

2. A hog oiler comprising a pan having a vertical conduit in a wall thereof, the lower extremity of said conduit being in communication with the interior of the pan adjacent the bottom thereof, the opposite extremity of the conduit being in communication with the atmosphere, a drum rotatably supported above the pan and extending therein, and means for preventing the rotation of the drum in one direction, said means including a member overlying the upper end of the conduit.

In testimony whereof I hereunto affix my signature in the presence of two witnesses.

FRANK ALLDRITT.

Witnesses:
GEO. R. WESTPHAL,
F. J. MARSHALL.

Copies of this patent may be obtained for five cents each, by addressing the "Commissioner of Patents, Washington, D. C."